United States Patent [19]
Williams

[11] Patent Number: 5,815,999
[45] Date of Patent: Oct. 6, 1998

[54] METHOD AND APPARATUS FOR STRENGTHENING FRAME BUILDINGS

[76] Inventor: Merlin Ray Williams, 2625 Sage Ct., Antioch, Calif. 94509

[21] Appl. No.: 975,967

[22] Filed: Nov. 21, 1997

[51] Int. Cl.[6] .............................. E02D 27/50; H04H 9/14
[52] U.S. Cl. .................................. 52/223.13; 52/223.14; 52/92.2; 52/93.1; 52/1; 52/167.1; 52/293.3; 52/713; 52/745.21; 52/741.3
[58] Field of Search ........................... 52/223.13, 223.14, 52/293.3, 295, 713, 167.1, 92.2, 93.1, 741.3, 745.21, 1

[56] References Cited

U.S. PATENT DOCUMENTS

| | | | |
|---|---|---|---|
| 5,384,993 | 1/1995 | Phillips | 52/92.2 |
| 5,448,861 | 9/1995 | Lawson | 52/92.2 |
| 5,535,561 | 7/1996 | Schuyler | 52/223.13 |
| 5,570,549 | 11/1996 | Lung et al. | 52/295 |
| 5,664,389 | 9/1997 | Williams | 52/677 |

*Primary Examiner*—Robert Canfield
*Attorney, Agent, or Firm*—Linval B. Castle

[57] ABSTRACT

A method and apparatus for strengthening a frame building with extension rebars clamped to the foundation rebar and extending between the studs and through the double plate between the rafters, includes a clamp that automatically corrects for building shrinkage. The clamp includes a steel shear plate on top of the double that has a central hole for passage of the extension rebar and a pair of steel plates clamped to the extension rebar. The bottom edges of the steel plates are angled from the surface of the surface of the shear plate and a spring biased wedge in the gap maintains tension of the extension rebar. Rafters may also be secured to the extension rebar by hooking a metal strap steel over a horizontal rebar on the rafters.

8 Claims, 1 Drawing Sheet

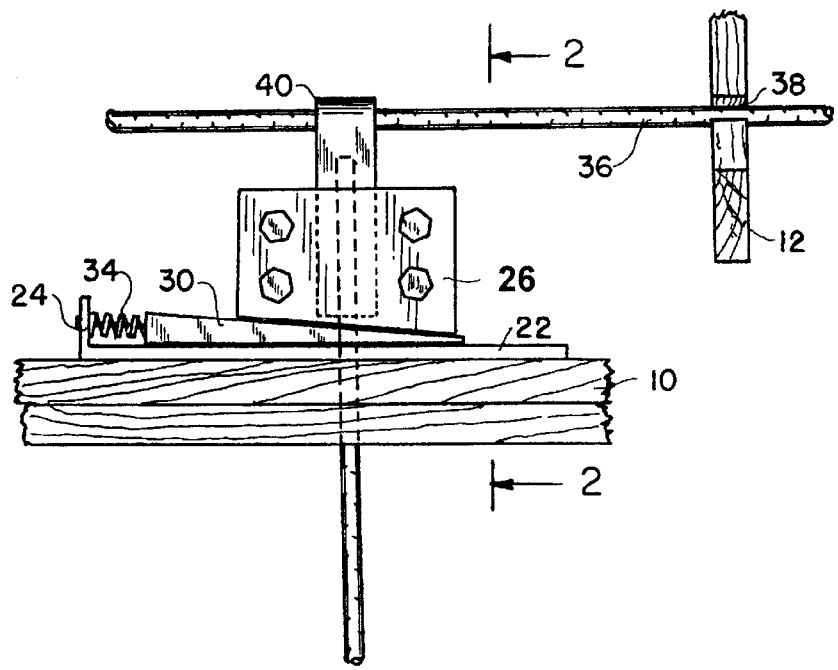
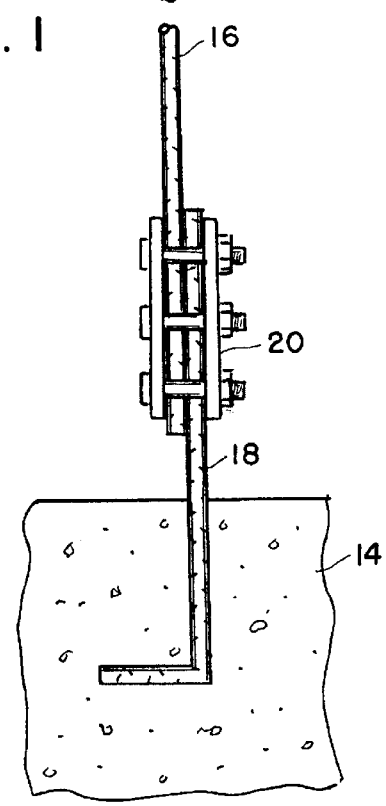
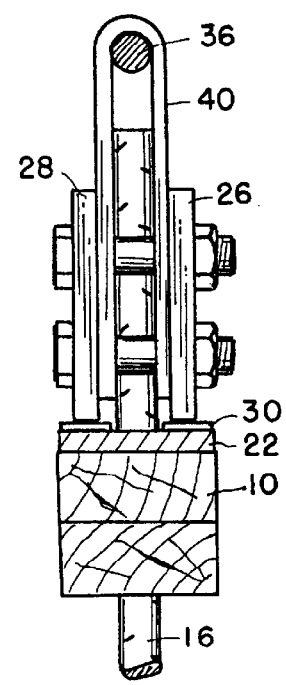
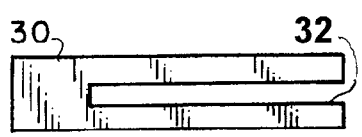
FIG. 1
FIG. 2
FIG. 3

METHOD AND APPARATUS FOR STRENGTHENING FRAME BUILDINGS

This invention relates to small building construction and more particularly to a method and apparatus for strengthening wood frame buildings against destructive high winds and earthquakes.

BRIEF SUMMARY OF THE INVENTION

Most small buildings such as residential buildings and two or three story apartments and commercial buildings are usually constructed of a wood frame suitably covered with appropriate wall materials. The wood frame is bolted to a concrete foundation. All modern buildings are build upon strong heavy concrete foundations which, in most instances, in several times heavier than the total weight of the overlying structures.

My U.S. Pat. No. 5,664,389, issued on Sep. 9, 1997 describes a method and apparatus for strengthening a building during construction. The method involves extending the ends of the reinforcing steel bars (rebars) from the foundation, clamping on an additional length of rebar and extending the new length vertically between the wall studs and through the plates to the ceiling joist where it is attached by a special clamp that attaches to the rebar and which may be nailed to the wood top plate supporting the ceiling joists. Thus, the top plates and ceiling joists are effectively secured directly to the heavy foundation and do not rely upon nails and various types of sheet metal tie strips and connectors to hold a building together.

A shrinkage problem exists when attaching the top plates to the concrete foundation of buildings constructed of green or untreated wood. A normal 2-story building has been found to vertically shrink approximately ⅜ inches during the first two years after construction; shrinkage is negligible thereafter. Such shrinkage in a building which is built with rigid rebars connected between the foundation and through the walls to the plates between the ceiling joists will cause the joist clamps to loosen and produce play in the rebars, thus making them lose their ability to hold the building together in the event of a catastrophic wind or earthquake.

This invention is for a joist clamp assembly that corrects for vertical shrinkage and automatically self adjusts itself to maintain a tight connection between top plates and ceiling joists and the heavy concrete foundation irrespective of shrinkage.

Briefly described, the joist clamp assembly of the invention includes a shear plate that is nailed to the top of the plates between the ceiling joists, and a spring biased steel wedge between the shear plate and an anchor clamped to a rebar and extending from the foundation through the shear plate. As an added feature, to protect the roof from high winds, the roof rafters may be secured to the foundation by adding a strap iron "hair pin" that is clamped to the anchor and rebar and hooked over an additional rebar laying horizontally in across the notched rafters.

BRIEF DESCRIPTION OF THE DRAWINGS

In the drawings which illustrate the preferred embodiment of the invention:

FIG. 1 illustrates a rebar extending from the foundation to the top plates between ceiling joists;

FIG. 2 is a view taken along the lines 2—2 of FIG. 1 showing the clamp and "hair pin"; and FIG. 3 is a plan view of the wedge.

DETAILED DESCRIPTION

Wood frame buildings are easily damaged or destroyed by very high winds and also by strong earthquakes. They can easily and quite inexpensively be constructed to withstand the high winds and earthquakes if their top plates and ceiling joists or rafters were securely fastened to their heavy foundations. This may be done by extending about eight or more foundation reinforcing steel bars (rebars) up through the walls and attaching them to the top plates or rafters as described in U.S. Pat. No. 5,664,389, issued September 1997. But this does not solve all the problems. A building constructed of untreated or green lumber has been shown to vertically shrink; a two story building will shrink approximately ⅜ inches in the first two years,, and this shrinkage will introduce play in the long rebars making them useless unless tension on them is maintained. The present invention maintains the required tension. And in addition, the invention is for a connector between the vertical rebars and a horizontal rebar covering the rafters so that the rafters are connected directly with the heavy foundation.

The concrete foundation of a modern frame house or apartment building is heavy, usually several times heavier than its overlying structure. As shown in FIG. 1, the structure may be strengthened by connecting the top plate 10 between the joists and rafter 12 to that heavy foundation 14 by clamping an extension length of rebar 16 to the foundation rebar 18 which extends above the top surface of the foundation, through the wood plates and between the studs, and attaching the top end of the rebar 16 to the top plate 10. A 1" diameter grade 40 rebar having tensile strength of approximately 70,000 pounds is very adequate; the clamp 20 formed of two ⅜" steel plates connected by six ⅝" steel bolts with nuts, as illustrated, has been tested above that tensile strength. Normally, about ten of such rebars would be used in the construction of a 2-story dwelling. But as previously discussed, the rebars will become useless if the building shrinks and no means are provided for maintaining them tight and under a degree of tension.

The rebar 16 is maintained under a degree of tension by a clamp which includes a ⅜" thick steel shear plate 22 that is secured on the top surface of the top plate 10 and which has a centered clearance hole for passage of the rebar 16. One end of the shear plate 22 has a right angle turned up extension 24 that extends approximately 1½" above the top surface of the shear plate.

Attached to the upper end of the rebar 16 which extends through the shear plate 22 approximately four inches, is a clamp formed of two identical ⅜" steel plates 26, 28 about 4" in width, that are bolted together around the rebar, as shown in FIG. 2. The lower edge of the steel plates 26, 28 are not parallel with the top surface of the adjacent surface of the shear plate 22, but are angled with respect thereto approximately 10°. A steel wedge 30 having a wedge angle of approximately 10° is inserted between the shear plate 22 and the plates 26, 28. The wedge 30 has a central slot 32 having a width slightly greater than the diameter of rebar 16, and is maintained under a constant spring force by a helical compression spring 34 between the shear plate extension 24 and the wide end of the wedge 30. To assure proper operation of the wedge and to avoid oxidation and interfriction between the components, the wedge 30, shear plate 22 and at least the lower edges of the steel plates 26, 28 should be treated with an anti-rust coating.

In operation, as shrinking occurs in the building the rebar 16 will push through the top plate 10 to lift the plates 26, 28. As the plates rise, the spring biased spring 34 will urge the wedge 30 between the plates and the shear plate 22 thereby maintaining a degree of tension on the rebar 16.

Very strong winds, such as cyclonic storms, often remove the roof from a building. To at least hold the rafters of a building having rebars connecting the top plates to the foundation, it is a very simple addition to have the rebars also hold down the rafters. The sheathing and roof covering may be lost but the costly rafter construction can easily be saved by extending horizontal rebars 36 in slots 38 in the rafters 12. The horizontal rebar 36 is then connected to the foundation 14 by a hair-pin shaped steel bar 40 that is looped over the horizontal rebar 36 and its two legs are clamped with the rebar 16 in the clamp 26 as best shown in FIG. 2. It should be noted that the slots 38 in the rafter should be as deep as practical because building shrinkage correction is effective only below the position of the wedge 34.

I claim:

1. A clamp for frame building strengthened with a steel rebar under tension extending from a heavy foundation and through a plate between ceiling joists, for automatically maintaining said tension and adjusting against shrinkage of the building, said clamp comprising:

a flat shear plate horizontally, adapted to be secured on top of said plate between the ceiling joists, said shear plate having a central hole for clearance of said steel rebar and having a vertical lip at one end;

a pair of identical parallel plates, adapted to be clamped together around said steel rebar extending above said shear plate, said pair of identical plates having parallel lower surfaces angled with respect to the surface of said shear plate;

a wedge insertable between said shear plate and said lower surfaces of said pair of identical plates, said wedge having a central longitudinal slot for clearance of said steel rebar, said wedge having a wedge angle substantially identical to the angle between said shear plate surface and the lower surfaces of said identical plates; and spring means between said vertical lip on said shear plate and said wedge for urging said wedge between said shear plate surface and said identical plates.

2. The clamp claimed in claim 1 wherein said wedge, said identical plates and said shear plate are coated to prevent oxidation and interfriction.

3. The clamp claimed in claim 1 wherein said wedge angle is approximately 10 degrees.

4. The clamp claimed in claim 1 further including a roof strengthener including:

a horizontal rebar adapted to be secured above said clamp to a plurality of rafters;

a hairpin shaped metal bar having ends and having a center looped over said horizontal rebar, the ends of said bar being secured in said clamp between the steel rebar and said identical parallel plates.

5. The clamp claimed in claim 4 wherein said horizontal rebar is adapted to be secured in slots in said plurality of rafters.

6. The method for strenghening frame buildings having heavy foundations, walls, joists, and rafters said method comprising the steps of:

extending one end of a foundation rebar above an upper surface of the foundation;

clamping to said end of said foundation rebar a vertical rebar extension that extends up through the walls between the joists and terminates above the top plate between the rafters of the building;

placing upon said top plate and over said extension rebar a flat steel shear plate having a central hole through its surface for passage of said extension rebar and a vertical lip at one end;

clamping to the end of said rebar extension an angled clamp having a lower surface adjacent and spaced from said shear plate, said lower surface being angled with respect to the top surface of said shear plate; and inserting a wedge between the top surface of said shear plate and the lower surface of said angled clamp, said wedge having a central slot for clearance around said extension rebar and a spring between an end of said wedge and said vertical lip on said shear plate, said spring urging said wedge between the surface of said shear plate and said angled clamp.

7. The method for strengthening frame building claimed in claim 1 further including the step of securing roof rafters to said extension rebar, said step including:

securing a rafter rebar substantially horizontally across a plurality of roof rafters, aligning said rafter rebar above said angled clamp; and looping a hairpin shaped metal bar over said rafter rebar and securing the ends of said bar to said angled clamp.

8. The method for strengthening a frame building claimed in claim 7 wherein said rafter rebar is secured in slots in the rafters.

* * * * *